(12) United States Patent
Ayle

(10) Patent No.: US 8,857,566 B2
(45) Date of Patent: Oct. 14, 2014

(54) ACOUSTIC STRUCTURE WITH INCREASED BANDWIDTH SUPPRESSION

(71) Applicant: Hexcel Corporation, Dublin, CA (US)

(72) Inventor: Earl Ayle, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 14/157,551

(22) Filed: Jan. 17, 2014

(65) Prior Publication Data

US 2014/0131136 A1    May 15, 2014

Related U.S. Application Data

(62) Division of application No. 13/466,232, filed on May 8, 2012, now Pat. No. 8,651,233.

(51) Int. Cl.
*G10K 11/172* (2006.01)
*E04B 1/82* (2006.01)
*B64D 29/00* (2006.01)
*B32B 3/12* (2006.01)

(52) U.S. Cl.
CPC . *B64D 29/00* (2013.01); *B32B 3/12* (2013.01); *G10K 11/172* (2013.01)
USPC .......................................................... 181/292

(58) Field of Classification Search
USPC .......................................................... 181/292
See application file for complete search history.

(56) References Cited

U.S. PATENT DOCUMENTS

| | | |
|---|---|---|
| 3,769,767 A | 11/1973 | Scott |
| 4,001,473 A | 1/1977 | Cook |
| 4,265,955 A | 5/1981 | Harp et al. |
| 4,421,201 A | 12/1983 | Nelsen et al. |
| 6,122,892 A | 9/2000 | Gonidec et al. |
| 6,371,242 B1 | 4/2002 | Wilson et al. |
| 6,607,625 B2 | 8/2003 | Andre et al. |
| 6,827,180 B2 | 12/2004 | Wilson |
| 7,434,659 B2 | 10/2008 | Ayle |
| 2006/0219477 A1 | 10/2006 | Ayle |
| 2011/0108357 A1 | 5/2011 | Vauchel et al. |
| 2012/0037449 A1 | 2/2012 | Ayle |

FOREIGN PATENT DOCUMENTS

| | | |
|---|---|---|
| EP | 0824066 | 2/1998 |
| WO | 9222053 | 12/1992 |
| WO | 2011/034469 | 3/2011 |
| WO | 2013/084135 | 6/2013 |

*Primary Examiner* — Jeremy Luks
(74) *Attorney, Agent, or Firm* — W. Mark Bielaski; David J. Oldenkamp

(57) ABSTRACT

The bandwidth or acoustical range of a nacelle or other type of acoustic structure is increased by acoustically coupling honeycomb cells together to form pairs of acoustic cells that have an effective acoustic or resonator length that is up to twice that of either acoustic cell taken alone.

20 Claims, 3 Drawing Sheets

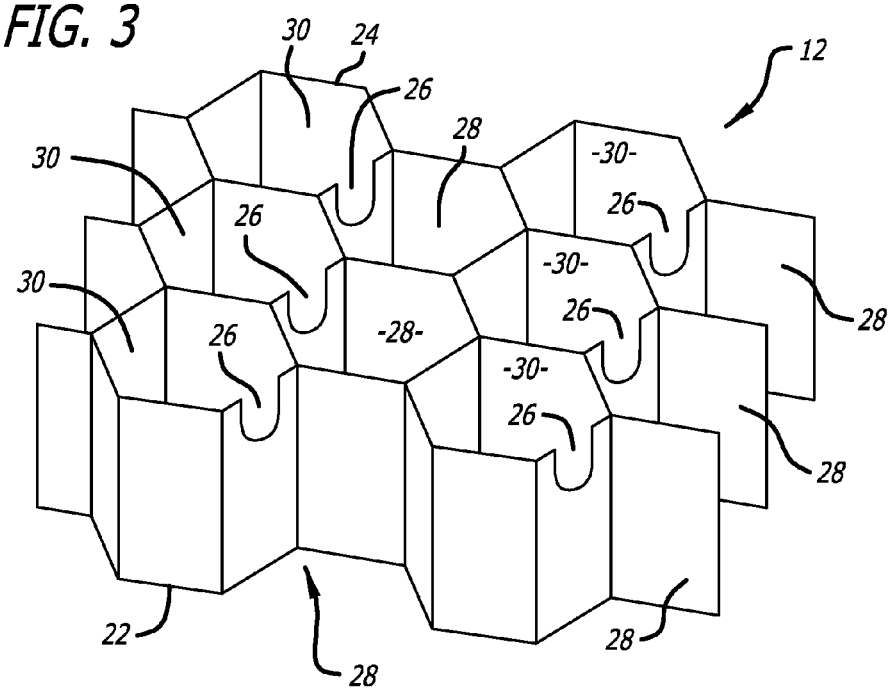
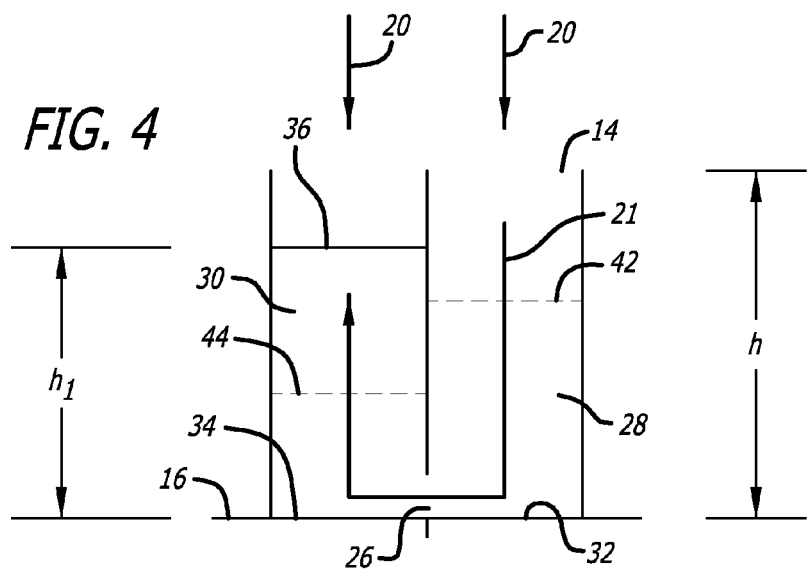

ACOUSTIC STRUCTURE WITH INCREASED BANDWIDTH SUPPRESSION

This application is a divisional of co-pending application Ser. No. 13/466,717 which was filed on May 8, 2012.

BACKGROUND OF THE INVENTION

1. Field of the Invention

The present invention relates generally to acoustic structures that are used to attenuate noise that emanates from a particular source. More particularly the present invention is directed to providing relatively thin acoustic structures that are capable of attenuating a wide range of noise frequencies including relatively low-frequency noise, such as the low-frequency noise that is generated by the engines of aircraft.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed at the end located away from the engine and covered with a porous covering at the end located closest to the engine. The closing of the honeycomb cells with acoustic material in this manner creates an acoustic resonator that provides attenuation, dampening or suppression of the noise. Acoustic septums are also usually located within the interior of the honeycomb cells in order to provide the resonator with additional noise attenuation properties.

A basic problem facing acoustic engineers is to make the nacelle as thin and lightweight as possible while still providing adequate suppression or dampening of the sound wave frequencies over the entire range of noise generated by the jet engine. This basic design problem is complicated by the fact that the trend in newer models of large jet engines is to produce additional noise at lower frequencies. The new engine designs tend to use fewer fan blades that produce more by-pass air at a slower velocities. This results in the production of engine noise having a lower frequency.

The particular frequencies of noise that are dampened by a given honeycomb cell or resonator is directly related to the depth of the cell. In general, as the frequency of the noise decreases, the depth of the cell must be increased in order to provide adequate dampening or suppression. Relatively thin nacelles having cell depths on the order of 1 inch or less are adequate for absorbing the higher frequency ranges generated by a jet engine. However, in order to absorb the lower frequencies that are being generated by newer jet engines, acoustic cell or resonator depths on the order of 2½ inches or more are required.

One approach to solving the problem of absorbing the lower frequency jet noise is to simply build nacelles with deeper cells. However, this results in an increase in the size and weight of the nacelle which is contrary to the design goal of providing nacelles that are as thin and light weight as possible. In addition, the increase in weight and size of the nacelle required to absorb low-frequency noise may be unacceptable, especially for larger aircraft engines where the size and weight of the nacelle is a major engineering design consideration.

There presently is a need to design engine nacelles and other acoustic structures where the acoustic structure is capable of suppressing a wider range of noise frequencies without increasing the thickness or weight of the nacelle acoustic structure.

SUMMARY OF THE INVENTION

In accordance with the present invention, it was discovered that the bandwidth or acoustical range of a nacelle or other type of acoustic structure can be increased by acoustically coupling honeycomb cells together to form pairs of acoustic cells that have an effective acoustic or resonator length that is up to twice that of either acoustic cell taken alone. This increase in effective resonator length produces a nacelle or acoustic structure that is capable of absorbing relatively low noise frequencies without increasing the thickness or weight of the nacelle.

The present invention is directed to acoustic structures, in general, and to nacelles for aircraft engines, in particular. The acoustic structures in accordance with the present invention include a honeycomb that has a first edge located closest to the noise source and a second edge located away from the noise source. The honeycomb includes a plurality of first acoustic cells wherein each of the first acoustic cells shares a common wall with a second acoustic cell. Each of the first acoustic cells is terminated by a first acoustic barrier that is located at or near the second edge of the honeycomb. The second acoustic cells are terminated by a second acoustic barrier that is also located at or near the second edge of the honeycomb.

As a feature of the present invention, an acoustic pathway is located in the common wall between the first and second acoustic cells to acoustically couple the cells together. The acoustic pathway is located between the first edge of the honeycomb and the first and second acoustic barriers. A third acoustic barrier is provided in the second acoustic cell to provide an acoustic termination of the second acoustic cell at the first edge of the honeycomb or between the first edge of the honeycomb and the acoustic pathway. The coupling of acoustic cells and the acoustic barriers provide a first noise attenuation zone that includes the first acoustic cell, as well as the portion of the second acoustic cell located between the second acoustic barrier and the third acoustic barrier. As a result, the first noise attenuation zone or resonator has an effective acoustic length that can be up to two times the depth of the honeycomb.

As a further feature of the present invention, placement of the third acoustic barrier at a position between the first edge of the honeycomb and the acoustic pathway provides for a second noise attenuation zone that has a length equal to the distance between the third acoustic barrier and the first edge of the honeycomb. As a result, the second noise attenuation zone or resonator has an effective acoustic length that is shorter than the depth of the honeycomb.

A wide variety of effective acoustic lengths for the first and second noise attenuation zones can be achieved by simply varying the distance between the third acoustic barrier and the first edge of the honeycomb for a given pair of coupled acoustic cells. The present invention provides a significant advantage over conventional acoustic honeycomb where the acoustic cells all have the same effective acoustic lengths and the only way of lengthening the cells is to increase the thickness of the honeycomb.

The acoustic coupling of cells together in accordance with the present invention provides noise attenuation zones that can have effective acoustic lengths which range from a fraction of the honeycomb thickness up to twice the thickness of the honeycomb or more. The ability to form acoustic cells having lengths that are smaller or greater than the thickness of the honeycomb provides a significant increase in the band with or range of frequencies that can be absorbed by the acoustic honeycomb structure. In addition, the ability to acoustically lengthen honeycomb cells without increasing the honeycomb thickness is especially useful for jet engine nacelles where it is desirable to make the honeycomb as thin as possible while still providing acoustic resonators that are capable of dampening low-frequency jet engine noise.

The above described and many other features and attendant advantages of the present invention will become better understood by reference to the following detailed description when taken in conjunction with the accompanying drawings.

BRIEF DESCRIPTION OF THE DRAWINGS

FIG. 3 is a perspective view of a partial acoustic honeycomb showing the acoustic pathways between the cells.

FIG. 4 is a schematic view showing the acoustic properties of first and second noise attenuation zones that are formed by acoustically coupling two adjacent acoustic cells together.

DETAILED DESCRIPTION OF THE INVENTION

Figure 1:
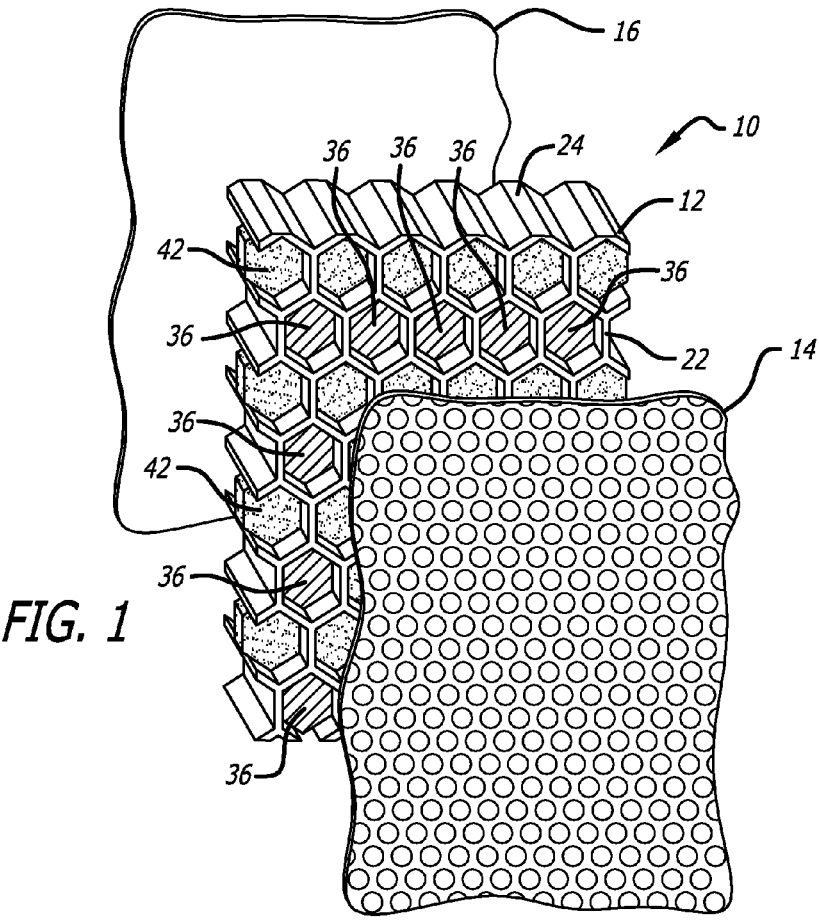
FIG. 1 shows an exemplary acoustic structure in accordance with the present invention prior to the solid and the porous face sheets being bonded to the acoustic honeycomb.
Figure 2:
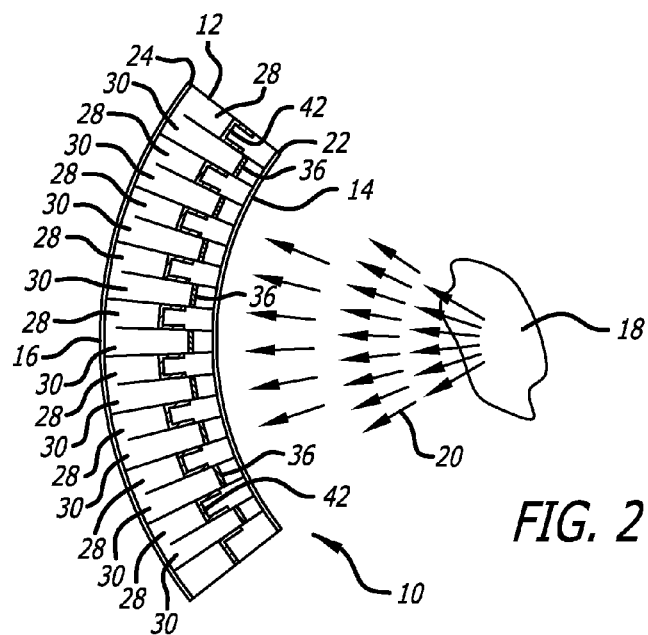
FIG. 2 shows a portion of a nacelle in place adjacent to a an engine noise source.

A partially exploded view of a portion of an exemplary acoustic structure 10 in accordance with the present invention is shown in FIG. 1. The acoustic structure 10 includes an acoustic honeycomb 12 which is sandwiched between a porous face sheet 14 and a solid acoustic barrier face sheet 16. The assembled acoustic structure 10 is shown in FIG. 2 where it is located adjacent to a noise source 18 which is generating noise as represented by arrows 20. Although the acoustic structure of the present invention may be used for dampening noise from a wide variety of noise sources, the acoustic structure is particularly well-suited for dampening noise generated by aircraft engines and particularly the large engines used for commercial aircraft. Accordingly, the acoustic structure shown at 10 in FIG. 2 is typically part of a nacelle which surrounds the central core of a turbofan jet engine 18.

As shown in the FIGS. 1-3, the honeycomb 12 includes a first edge 22 that is located closest to the noise source 18 and a second edge 24 that is located away from the noise source 18. As a feature of the present invention, the honeycomb 12 includes cells 28 and 30 that are coupled together by way of an acoustic pathway 26 to form pairs of acoustically-coupled cells. The individual pairs of cells 28 and 30 share a common wall in which the acoustic pathway 26 is formed. Each cell 28 may be viewed as a first acoustic cell that is defined by the honeycomb walls that extend between the first and second edges 22 and 24. Each cell 30 may be viewed as a second acoustic cell that is also defined by the honeycomb walls that extend between the first and second edges 22 and 24. The solid face sheet 16 serves as a first acoustic barrier 32 for the first acoustic cells and a second acoustic barrier 34 for the second acoustic cells.

Although it is preferred that the acoustic barriers 32 and 34 be provided by a single solid face sheet located along the second edge 24 of honeycomb 12, it is also possible to form the first and second acoustic barriers 32 and 34 with individual solid inserts that are displaced within the honeycomb cells away from the honeycomb cell edge. The positioning of such individual solid inserts must be such that the acoustic pathway 26 is located between the first edge of the honeycomb 22 and the first and second acoustic barriers 32 and 34.

The acoustic pathway can be located in the common cell wall at a position spaced away from the honeycomb second edge. However, it is preferred that the acoustic pathway be formed by arcuate shaped slots 26, as shown in FIG. 3, which seat against the solid face sheet 16 to provide a closed arched shaped acoustic pathway. The acoustic pathway can have a wide variety of shapes provided that the opening in the common cell wall is sufficiently large to allow sound waves to travel through the pathway from the first acoustic cell 28 to the second acoustic cell 30. Arch shaped or other contoured openings of the type shown at 26 are preferred since they reduce the chance of fatigue cracking of the cell wall.

As a further feature of the invention, a third acoustic barrier 36 is provided in the second acoustic cells 30. The third acoustic barriers 36 may be located along the first edge 22 of the honeycomb. However, it is preferred that the third acoustic barriers 36 be formed by individual solid inserts that are displaced inward from the first edge 22 of the honeycomb. The displacement of the acoustic barrier 36 into the second acoustic cell 30 provides additional sound dampening as will be discussed below.

Figure 5:
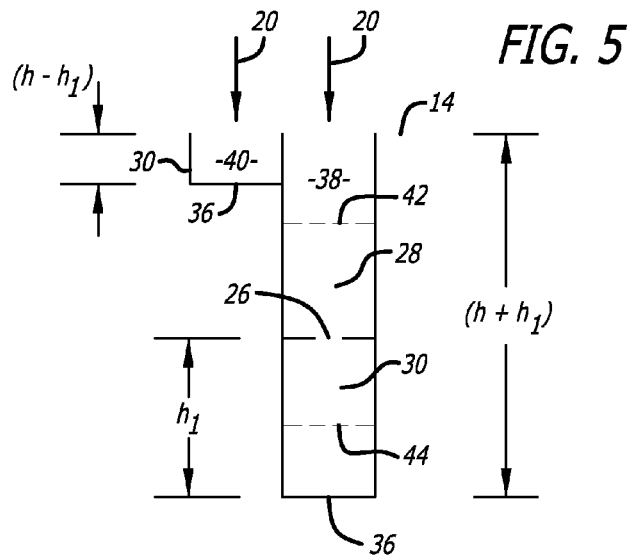
FIG. 5 is a further schematic drawing showing the acoustic properties of the first and second noise attenuation zones.

FIGS. 4 and 5 are schematic representations of the acoustic dampening properties that are achieved when the first and second acoustic cells 28 and 30 are paired together by way of an acoustic pathway 26 in accordance with the present invention. As shown in FIG. 4, noise 20 enters the honeycomb through porous face sheet 14. The sound waves, as represented by arrow 21, travel down through the first acoustic cell 28 until they reach the first acoustic barrier 36 where they are directed laterally through the acoustic pathway 26. The second acoustic barrier 34 prevents the sound waves from escaping so that they are directed back up the second acoustic cell 30 until they are stopped by the third acoustic barrier 36. The acoustically coupled-cells provide two noise attenuation zones or resonators that are capable of dampening or impeding noise having different wavelengths. The first noise attenuation zone is formed by the first acoustic cell 28 and that portion of the second acoustic cell 30 located below the third acoustic barrier 36. The effective acoustic or resonator length of the first noise attenuation zone is $(h+h_1)$. The second noise attenuation zone is formed by that portion of the second acoustic cell 30 that is located between the third acoustic barrier 36 and the first edge of the honeycomb. The effective resonator length of the second attenuation zone is $(h-h_1)$.

Referring to FIG. 5, the two noise attenuation zones or resonators are shown schematically side-by-side where the first noise attenuation zone is shown at 38 and the second noise attenuation zone is shown at 40. The acoustic coupling of the two cells together forms one resonator 38 that is substantially deeper than the other resonator 40. Accordingly, instead of having an acoustic structure where all cells are the same, the present invention provides the significant advantage of having one relatively long or deep acoustic resonator that is capable of dampening relatively low noise frequencies, while at the same time providing a second resonator that is capable of dampening noise frequencies that have a relatively higher frequency.

Additional frequency dampening and attenuation can be provided by including one or more acoustic septums within one or both of the coupled acoustic cells. For example, acoustic septum 42 is included in the first acoustic cell 28 to provide an attenuator with two degrees of freedom. A second acoustic septum 44 may optionally be included in the second acoustic cell 30 to provide an attenuator with three degrees of freedom.

The acoustic septum can be made from any of the standard acoustic materials used it to provide noise attenuation including woven fibers and perforated sheets. The use of the woven fiber acoustic septums is preferred. These acoustic materials are typically provided as relatively thin sheets of an open mesh fabric that are specifically designed to provide noise attenuation. It is preferred that the acoustic material be an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), polyamide 6 (Nylon 6, PA6) and polyamide 12 (Nylon 12, PA12) are just a few examples. Open mesh fabric made from PEEK is preferred for high temperature applications, such as nacelles for jet engines. Exemplary septums are described in U.S. Pat. Nos. 7,434,659; 7,510,052 and 7,854,298. Septums made by laser drilling plastic sheets or films may also be used.

Figure 6:
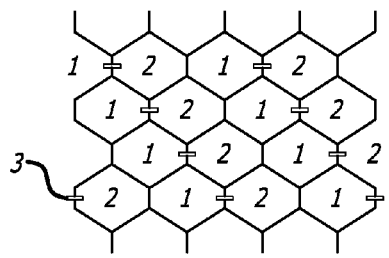
FIG. 6 is a simplified view of an acoustic honeycomb showing an exemplary arrangement for acoustically coupling the honeycomb cells together in order to provide lower-frequency noise dampening.
Figure 7:
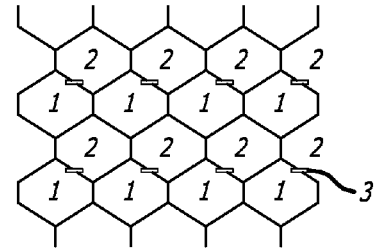
FIG. 7 is a simplified view of an acoustic honeycomb showing an alternate exemplary configuration for coupling the honeycomb cells together which also provides for low-frequency noise dampening.
Figure 8:
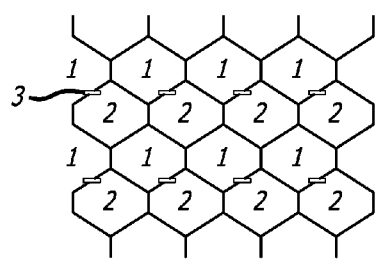
FIG. 8 is another simplified view of an acoustic honeycomb showing a further exemplary configuration for coupling the acoustic cells together in order to increase the low-frequency dampening capability of the acoustic structure without increasing the thickness of the structure.

There are a variety of ways in which adjoining acoustic cells can be coupled together to form the first and second noise attenuation zones. Some examples of possible cell coupling configurations are shown in FIGS. 6, 7 and 8. In these figures, cells that are numbered 1 correspond to first acoustic cells 28 and cells that are numbered 2 correspond to second acoustic cells 30. The acoustic pathways connecting the two cells together are shown as solid bars 3.

If desired, all of the cells of a given acoustic structure may be acoustically coupled to form acoustic pairs or acoustically coupled cell pairs can be dispersed among non-acoustically coupled cells. In some situations, it is desirable that only certain portions of the acoustic structure include acoustically coupled cell pairs. For example, in many acoustic structures, including nacelles, it is common practice to include openings in the honeycomb cells that are located in the lower portions of the structure in order to allow any accumulated water to drain from the structure. The drainage openings interconnect a large number of honeycomb cells together in order to ensure that adequate water drainage pathways are provided to drain all of the water from the structure. Use of such widely interconnected water drain openings is inconsistent with the present invention Wherein the effective length of an acoustic cell is increased by way of coupling of two acoustic cells together.

The present invention has been described with respect to the acoustic coupling of only two adjacent cells together. If desired, three or more acoustic cells could be acoustically linked together using acoustic pathways and acoustic barriers in the same manner as described above with respect to the acoustic coupling of two cells. The linking of more than two acoustic cells together is warranted in those situations where the honeycomb is relatively thin and/or a relatively long resonator is required in order to dampen very low frequency noise. The number of the cells that are linked together would be determined by a combined consideration of the desired honeycomb thickness and the frequency range over which attenuation or dampening is desired.

The present invention has focused on the coupling of two cells together because the size and noise frequency requirements for dampening jet engine noise can be met using nacelles in which the honeycomb structure includes the coupling of two cells. For example, the low-end frequency range produced by large commercial jet engines is in the range of 500 to 2000 Hz. It was found that honeycomb having a thickness of around 1 to 2 inches does not have the capability of dampening such low-frequency noise. However, by acoustically coupling the cells together, effective resonator lengths can be obtained that are able to suppress such low-frequency engine noise.

The materials used to make the honeycomb can be any of those typically used in acoustic structures including metals, ceramics and composite materials. Exemplary metals include aluminum and aluminum alloys. Exemplary composite materials include fiberglass, Nomex and various combinations of graphite or ceramic fibers with suitable matrix resins. Matrix resins that can withstand relatively high temperatures (300° F. to 400° F.) are preferred. The materials used to make the solid face sheet 16 can also be any of the solid face sheet materials commonly used for acoustic structures which typically include the same type of materials used to make the honeycomb structure. The materials used to make the porous face sheet 14 can also be any of the materials commonly used for such porous structures provided that the pores or perforations in the structure are sufficient to allow the sound waves from the jet engine or other source to enter into the acoustic cells or resonators.

In general, the honeycomb cells will typically have a cross-sectional area ranging from 0.05 square inch to 1 square inch or more. The depth of the cells (honeycomb thickness or core thickness) will generally range from 0.25 to 3 inches or more. For jet engine nacelles, the honeycomb cells will typically have a cross-sectional area of between about 0.1 to 0.5 square inch and a depth of between about 1.0 and 2.0 inches. As an exemplary advantage of the present invention, nacelles having honeycomb cell depths at the lower end of the thickness range (1.0 inch) can provide the same low-frequency noise attenuation or suppression that is provided by nacelles having thicknesses at the upper end of the thickness range (2.0 inch). For example, if the first and second acoustic barriers 32 and 34 are located at the second edge 24 of the honeycomb and the third acoustic barrier 36 is placed 0.25 inch into the second acoustic cell 30 of an acoustic pair of cells 28 and 30, the resulting effective length of the acoustic cell pair is 1.75 inch and 0.25 inch.

The ability to take a nacelle that is a certain thickness and increase the effective resonator length up to two times and more is a significant advantage, since it allows one to make the nacelle as thin and lightweight as possible, while still being, able to dampen the relatively lower frequency noise that is being generated by your jet engine designs. In addition, the portion 40 of the second acoustic cell of the cell pair that is not used to extend the effective acoustic length of the first acoustic cell provides additional noise attenuation at a different (higher) frequency. This provides an increase in the range of frequencies (bandwidth) that can be effectively suppressed by the acoustic structure.

As mentioned previously, it is preferred that a solid face sheet 16 be used to close off the second edge of the honeycomb. In this situation, the first and second sound barriers 32 and 34 are all located along the second edge of the honeycomb. In accordance with the present invention, it is possible to increase the bandwidth or range of frequencies that can be suppressed by simply varying the location of the third acoustic barrier 36 within the second acoustic cell 30 of each acoustic pair 28 and 30. Even further increases in bandwidth suppression can be obtained by acoustically linking three or more cells together and combining these acoustically linked cells with the acoustically coupled cells at selected locations throughout the acoustic structure. Of course, it is also possible to provide acoustic structures which include single acoustic cells, acoustically coupled cell pairs and acoustically linked cell triplets.

Further variations in noise attenuation can be achieved by varying the size of the acoustic pathway 26 between coupled acoustic cell pairs 28 and 30. The size of the acoustic pathway is chosen based on the effective length of the resonator (first noise attenuation zone) that results from the acoustic pathway between coupled cells and the frequency of noise that is being suppressed.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An acoustic structure for reducing noise generated from a source, said acoustic structure comprising:
    a honeycomb comprising a first edge located closest to said source and a second edge, said honeycomb comprising a first acoustic cell defined by a plurality of walls that extend between said first and second edges and a second acoustic cell defined by a plurality of walls that also extend between said first and second edges of said honeycomb wherein said first acoustic cell and said second acoustic cell share a common wall;
    a first acoustic barrier for said first acoustic cell;
    a second acoustic barrier for said second acoustic cell;
    a surface in said common wall that defines an acoustic pathway between said first acoustic cell and said second acoustic cell, wherein said acoustic pathway is located between the first edge of said honeycomb and said first and second acoustic barriers; and
    a third acoustic barrier for said second acoustic cell wherein said acoustic pathway is located between the second acoustic barrier and said third acoustic barrier to thereby provide a first noise attenuation zone comprising the portion of said first acoustic cell located between said first edge and said first acoustic barrier and the portion of said second acoustic cell located between said second acoustic harrier and said third acoustic harrier, wherein said third acoustic harrier is displaced away from the first edge of said honeycomb such that said third acoustic barrier and the portion of said second acoustic cell located between said third acoustic barrier and said first edge form a second noise attenuation zone.

2. An acoustic structure according to claim 1 wherein said first acoustic barrier and said second acoustic barrier are located at the second edge of said honeycomb.

3. An acoustic structure according to claim 1 wherein an acoustically porous sheet covers the first edge of said honeycomb.

4. An acoustic structure according to claim 1 wherein at least one acoustic septum is located within said first acoustic cell.

5. An acoustic structure according to claim 1 wherein at least one acoustic septum is located within said second acoustic cell.

6. An acoustic structure according to claim 4 wherein at least one acoustic septum is located within said second acoustic cell.

7. An acoustic structure according to claim 4 wherein said acoustic septum comprises monofilament polymer fibers.

8. An acoustic structure according to claim 7 wherein said monofilament polymer fibers comprise polyether ether ketone.

9. An acoustic structure according to claim 1 wherein said acoustic structure is a nacelle for an engine.

10. An airplane comprising a nacelle according to claim 9.

11. A method for making an acoustic structure for reducing noise generated from a source, said method comprising the steps of:
    providing a honeycomb comprising a first edge located closest to said source and a second edge, said honeycomb comprising a first acoustic cell defined by a plurality of walls that extend between said first and second edges and a second acoustic cell defined by a plurality of walls that also extend between said first and second edges of said honeycomb wherein said first acoustic cell and said second acoustic cell share a common wall;
    providing a first acoustic barrier for said first acoustic cell;
    providing a second acoustic barrier for said second acoustic cell;
    forming a surface in said common wall that defines an acoustic pathway between said first acoustic cell and said second acoustic cell, wherein said acoustic pathway is located between the first edge of said honeycomb and said first and second acoustic barriers; and
    providing a third acoustic barrier for said second acoustic cell wherein said acoustic pathway is located between the second acoustic barrier and said third acoustic barrier to thereby provide a first noise attenuation zone comprising the portion of said first acoustic cell located between said first edge and said first acoustic barrier and the portion of said second acoustic cell located between said second acoustic barrier and said third acoustic barrier, wherein said third acoustic barrier is displaced away from the first edge of said honeycomb such that said third acoustic barrier and the portion of said second acoustic cell located between said third acoustic barrier and said first edge form a second noise attenuation zone.

12. A method for making an acoustic structure according to claim 11 wherein said first acoustic barrier and said second acoustic barrier are located at the second edge of said honeycomb.

13. A method for making an acoustic structure according to claim 11 which includes the step of locating an acoustically porous cover sheet at the first edge of said honeycomb.

14. A method for making an acoustic structure according to claim 11 which includes the step of locating at least one acoustic septum within said first acoustic cell.

15. A method for making an acoustic structure according to claim 11 which includes the step of locating at least one acoustic septum within said second acoustic cell.

16. A method for making an acoustic structure according to claim 14 which includes the step of locating at least one acoustic septum within said second acoustic cell.

17. A method for making an acoustic structure according to claim 14 wherein said acoustic septum comprises monofilament polymer fibers.

18. A method for making an acoustic structure according to claim 17 wherein said monofilament polymer fibers comprise polyether ether ketone.

19. A method for making an acoustic structure according to claim 9 wherein said acoustic structure is a nacelle for an engine.

20. A method for making an acoustic structure according to claim 13 wherein said nacelle forms part of an airplane.

\* \* \* \* \*